United States Patent
Forster

(10) Patent No.: US 8,534,562 B2
(45) Date of Patent: Sep. 17, 2013

(54) BADGE WITH RFID DEVICE

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 474 days.

(21) Appl. No.: 12/337,685

(22) Filed: Dec. 18, 2008

(65) Prior Publication Data

US 2010/0155492 A1    Jun. 24, 2010

(51) Int. Cl.
*G06K 19/06* (2006.01)
*G08B 13/14* (2006.01)

(52) U.S. Cl.
USPC ......................................... 235/492; 340/572.8

(58) Field of Classification Search
USPC ................. 235/380, 439, 487, 492; 340/572, 340/572.8
See application file for complete search history.

(56) References Cited

U.S. PATENT DOCUMENTS

| | | | |
|---|---|---|---|
| 6,165,386 A * | 12/2000 | Endo et al. ................. 252/500 |
| 6,278,413 B1 * | 8/2001 | Hugh et al. ............... 340/572.8 |
| 6,809,646 B1 | 10/2004 | Lee | |
| 7,379,024 B2 | 5/2008 | Forster et al. | |
| 2001/0006368 A1 * | 7/2001 | Maloney ................... 340/572.7 |
| 2002/0129527 A1 * | 9/2002 | Vaudreuil ..................... 40/655 |
| 2005/0252976 A1 | 11/2005 | Dietze | |
| 2006/0250254 A1 | 11/2006 | Harris et al. | |
| 2006/0267762 A1 | 11/2006 | Jedlicka et al. | |
| 2008/0278330 A1 * | 11/2008 | Hass ......................... 340/572.8 |

* cited by examiner

*Primary Examiner* — Daniel Hess
*Assistant Examiner* — Steven J Malone
(74) *Attorney, Agent, or Firm* — Avery Dennison Corporation

(57) ABSTRACT

An identification or security badge has a radio frequency identification (RFID) device that is on a flexible substrate of the badge. A first part of the flexible substrate, including a first part of an antenna of the RFID device, overlaps a second part of the substrate that contains a second part of the antenna, with the parts physically separated from one another. A holder of the badge may be mechanically coupled to the flexible substrate to provide the separation between the substrate parts. The holder may hold ends of the flexible substrate with clips, so that at least one part of the substrate has a curved or bowed (arcuate) shape that separates it from another part of the substrate. The separation of different antenna parts from each other means that at least part of the antenna is spaced away from a wearer of the badge.

15 Claims, 4 Drawing Sheets

US 8,534,562 B2

BADGE WITH RFID DEVICE

BACKGROUND OF THE INVENTION

1. Field of the Invention

The invention is in the field of badges such as identification badges or security badges.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

Attempts have been made to incorporate RFID devices into security or identification badges worn by workers or others. One difficulty in doing so, as was observed in U.S. Patent Pub. No. 2006/0250254 A1, is that water absorbs UHF signals and can therefore compromise the reliability of the reading of RFID devices. Since human beings are composed mostly of water, RFID detectors/readers may have difficulty communicating with RFID devices located very close to the body of a human.

Accordingly it will be appreciated that improvements in the use of RFID devices in badges would be desirable.

SUMMARY OF THE INVENTION

According to an aspect of the invention, an identification or security badge has a radio frequency identification (RFID) device that has portions in overlapped parts of the badge that are spaced apart from one another.

According to another aspect of the invention, an identification or security badge has a flexible substrate with overlapped parts that are held apart from one another by a holder, for example with an air space between the parts.

According to yet another aspect of the invention, an identification or security badge has a flexible substrate with an RFID device on different overlapped parts of the substrate.

According to still another aspect of the invention, an RFID device is on different parts of a flexible substrate. The different parts are overlapped and maintained in a spaced apart configuration. Each of the parts of the flexible substrate may include an antenna, an antenna element, or a portion of an antenna. The RFID device and the flexible substrate may be part of a badge or other device.

According to a further aspect of the invention, a badge includes: a radio frequency identification (RFID) device on a flexible substrate; and a holder that maintains the flexible substrate in a deformed condition providing increased thickness to the RFID device.

According to a still further aspect of the invention, an identification device includes: a monolithic substrate having a first substrate part and a substrate part; and a radio frequency identification (RFID) device on the substrate. Respective portions of the RFID device are on the substrate parts. The first substrate part overlaps the second substrate part, with separation maintained between at least portions of the substrate parts.

According to another aspect of the invention, a method of making an identification device includes the steps of: printing on a flexible substrate; overlapping parts of the flexible substrate; and spacing apart overlapped parts of the flexible substrate that include respective portions of a radio frequency identification (RFID) device that is on the flexible substrate.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

An identification or security badge has a radio frequency identification (RFID) device that is on a flexible substrate of the badge. A first part of the flexible substrate, including a first part of an antenna of the RFID device, overlaps a second part of the substrate that contains a second part of the antenna, with the parts physically separated from one another, such as by an air space. The parts of the antenna may be separate antennas, both coupled to an RFID chip of the RFID device. A holder of the badge may be mechanically coupled to the flexible substrate to provide the separation between the substrate parts. The holder may hold ends of the flexible substrate with clips, so that at least one part of the substrate has a curved or bowed (arcuate) shape that separates it from another part of the substrate. The separation of different antenna parts from each other means that at least part of the antenna is spaced away from a wearer of the badge, no matter what orientation the badge is in relative to a wearer. This allows improved function of the RFID device, for example enhancing the detection/read range of the RFID device by keeping part of the RFID device away from the body of a user, which might otherwise function to interfere with operation of RFID devices. For example the high water content of a human body may interfere with operation of RFID devices that operate with UHF signals.

Figure 1:
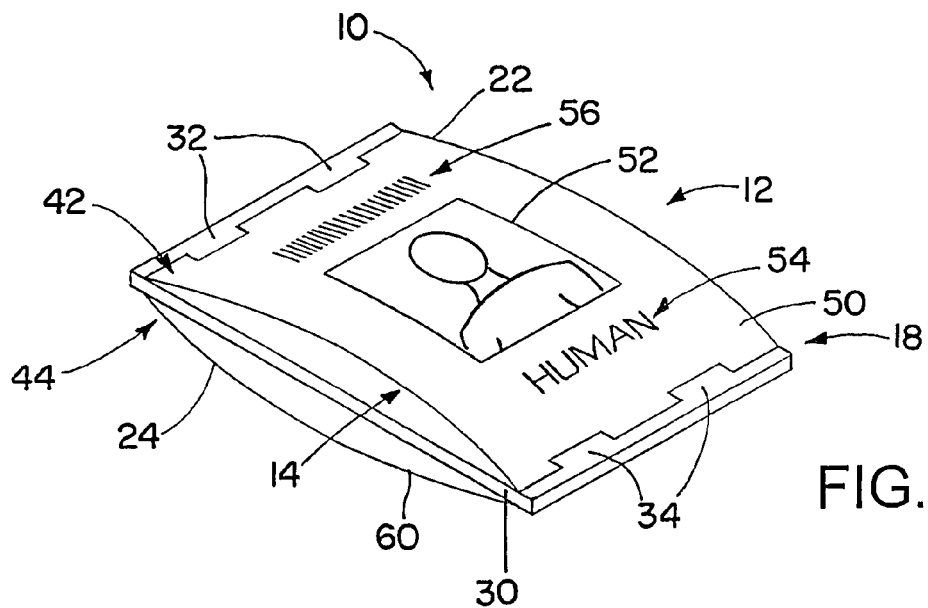
FIG. 1 is an oblique view of a badge in accordance with an embodiment of the present invention.
Figure 2:
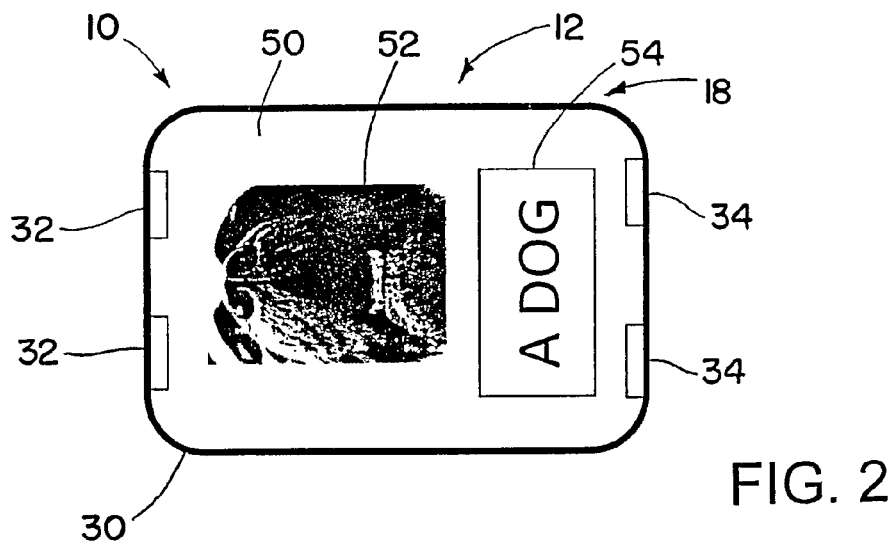
FIG. 2 is a plan view of the badge of FIG. 1.
Figure 3:
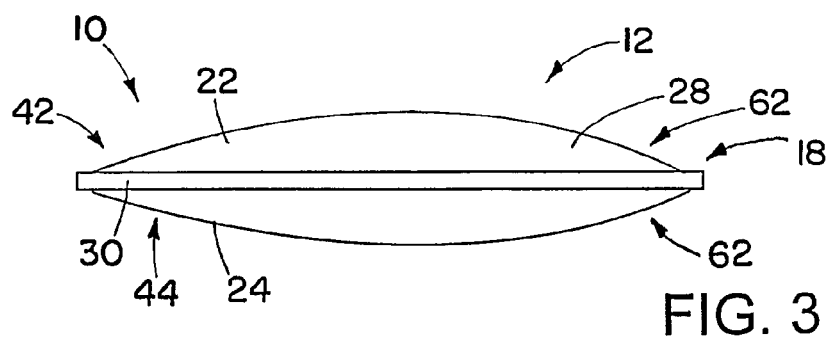
FIG. 3 is a side view of the badge of FIG. 1.

Referring initially to FIGS. 1-3, an identification badge 10, such as a security badge, includes a flexible substrate 12, which has on it a radio frequency identification (RFID) device 14. The badge 10 also includes a holder 18 that is mechanically coupled to the flexible substrate 12. The flexible substrate 12 overlaps, with a first substrate part 22 overlapping a second substrate part 24. The substrate parts 22 and 24 are bowed out (curved) away from one another, physically separated from one another. An air space 28 in the middle of the badge 10 is between the substrate parts 22 and 24.

The holder 18 maintains the substrate parts 22 and 24 physically separated from one another. The holder 18 has a rectangular frame 30, with pairs of clips 32 and 34 on opposite ends of the frame 30. The flexible substrate parts 22 and 24 are joined together at opposite ends 42 and 44. For example the flexible substrate 12 may be in a single piece, which may be folded at one of the ends 42, with the free edges attached together at the other end 44, such as with use of a suitable adhesive.

The badge 10 has a front face 50 facing outward from the first substrate part 22. The front face 50 may be printable and may have upon it various visual or machine readable elements or indicia which may be printed or otherwise affixed to the front face 50. For example the visual indicia may include a picture 52, text material 54, and a bar code 56. It will be appreciated that other visual material may be placed on either the front face 50 or a back face 60 of the badge 10 that is part of the second substrate part 24. Such other visual material may include (for example) logos, holograms, or other visual indicators. The front face 50 and the back face 60 are on a first major surface 62 of the flexible substrate 12 that faces outward when the flexible substrate 12 is secured by the holder as shown in FIG. 1.

Figure 4:
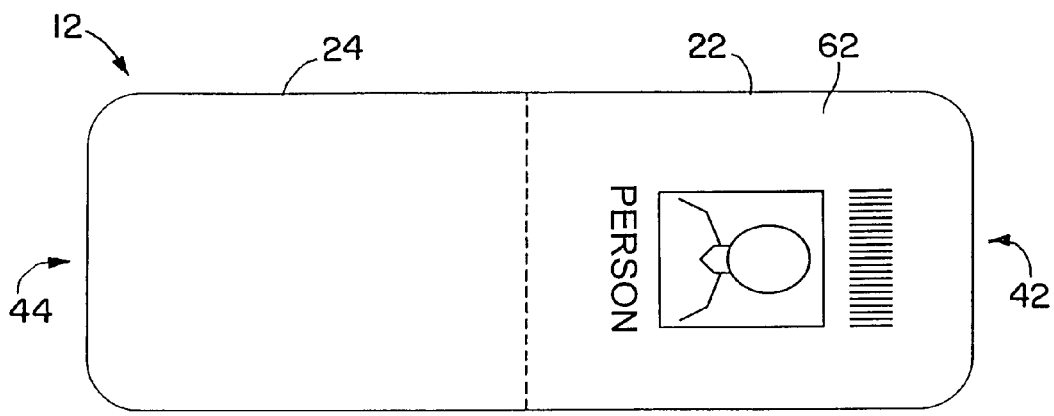
FIG. 4 is a plan view of a first side of a flexible substrate of the badge of FIG. 1.
Figure 5:
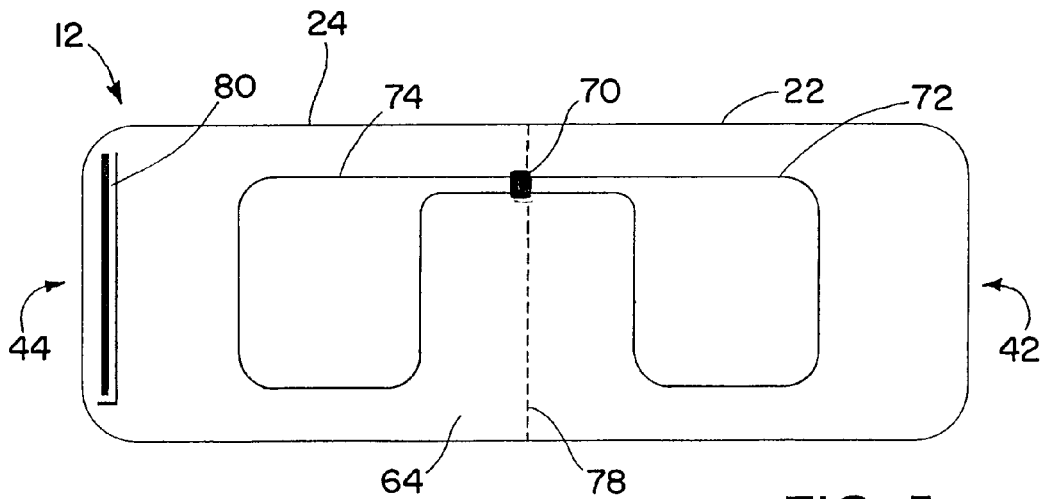
FIG. 5 is a plan view of a second side of a flexible substrate of the badge of FIG. 1.

With reference now in addition to FIGS. 4 and 5, the RFID device 14 is on a second major surface 64 of the flexible substrate 12, on an opposite side of the flexible substrate 12 from the first major surface 62. The first major surface 62 is on the inside of the badge 10 when the flexible substrate 12 is folded and inserted into the holder 18, as shown in FIG. 1. The RFID device 14 has an RFID chip 70, and a pair of antennas 72 and 74. The RFID chip 70 includes an integrated circuit, memory devices, and other suitable structures for controlling and/or regulating communication with external devices (such as readers and/or detectors), through sending and/or receiving signals through either or both of the antennas 72 and 74. It will be appreciated that the sending may be passive, as opposed to the active broadcasting of signals. Functions of the chip 70 are carried out by circuitry of the chip, using a variety of well-known electronic structures. The chip 70 may be directly connected to the antennas 72 and 74, or may alternatively be coupled to the antennas 72 and 74 using an intervening structure such as an interposer or strap. Such an interposer or strap may have conductive leads that facilitate electrical connection between the chip 70 and the antennas 72 and 74. Such electrical connection may be an electrical connection direct contact, characterized by a low electrical resistance, or alternatively a reactive electrical connection, where the contact is via an electric field, a magnetic field, or a combination of such fields.

The RFID chip 70 may be a two-port chip capable of being attached to both of the antennas 72 and 74 at the same time. The RFID chip 70 may include circuitry to choose which of the antennas 72 and 74 to communicate with. The selection may be made based on external signals, or may be made automatically, for example based on which of the antennas 72 and 74 receives a stronger signal. Alternatively the energy from the two antennas can be combined to provide power and data communications to the chip.

The antennas 72 and 74 are illustrated in FIG. 4 as loop antennas, but it will be appreciated that one or both of the antennas 72 and 74 may be other types of antennas, such as dipole antennas, slot antennas, or hybrid antennas combining features of different antenna types. The antennas 72 and 74 may be substantially identical to one another, as is illustrated in FIG. 4. Alternatively the antennas 72 and 74 may be different from one another in one or more of size, type, or configuration.

The antennas 72 and 74 are both on the second major surface 64 (inner surface or back surface) of the flexible substrate 12. The antenna 72 is on the substrate part 22, and the antenna 74 is on the substrate part 24. By putting the antennas 72 and 74 on separate substrate parts 22 and 24, at least one of the antennas 72 and 74 is always spaced away from the body of a wearer, no matter what the orientation of the badge 10 is relative to the wearer.

The RFID chip 70 may be located near a fold line or dividing line 78 between the substrate parts 22 and 24. The fold line 78 may divide the substrate 12 into two substantially equal substrate parts 22 and 24. The fold line 78 may be where the flexible substrate 12 is folded over or doubled over to produce the overlapping substrate that is part of the badge 10 (FIG. 1)

The flexible substrate 12 also has an adhesive strip 80 on one end. The adhesive strip 80 is used to secure the flexible substrate 12 in its overlapped condition, such as with the flexible substrate 12 folded or otherwise doubled over along the fold line 78. The adhesive of the adhesive strip 80 may be any of a variety of suitable adhesives, such as a pressure sensitive adhesive. It will be appreciated that the adhesive strip may be covered by a release layer (not shown) to protect it prior to use. It also will be appreciated that other mechanisms may be used to secure the flexible substrate in the overlapped condition, for example by crimping or heat sealing.

The flexible substrate 12 may be made of any of a variety of suitable materials, for instance including plastic (polymers), paper, or cardboard. The RFID device 14 may be a passive RFID device, an active RFID device, or a semi-passive (battery assisted passive) RFID device. The holder 18 may be made of a suitable molded thermoplastic. The rectangular frame 30 and the clips 32 and 34 may be made of a single piece of suitable molded thermoplastic for example.

Figure 6:
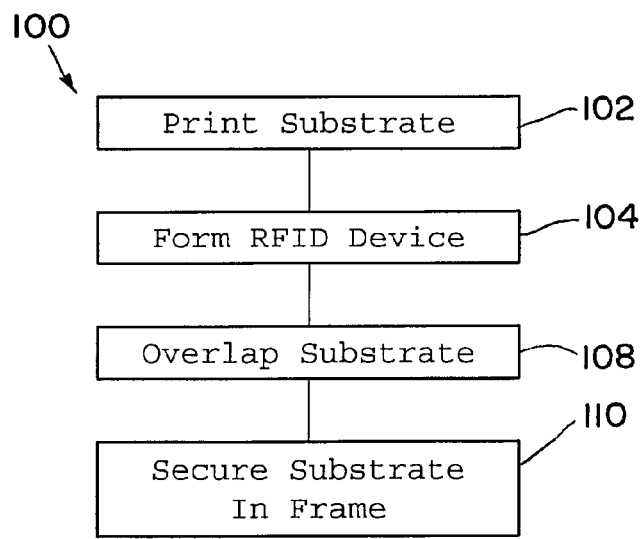
FIG. 6 is a high level flow chart of a method for making the badge of FIG. 1.

Turning now to FIG. 6, the badge 10 may be produced using a method 100. Various visual material may be printed on the first major surface 62 of the flexible substrate 12 in step 102. The RFID device 14 may be formed on the second major surface 64 of the flexible substrate 12 in step 104. The formation of the RFID device 14 may include printing operations, such as by printing the antennas 72 and 74 by printing of a conductive ink, and/or by selective printing of the adhesive strip 80. The RFID chip 70 may be placed by any of a variety of suitable placement methods, for example suitable methods to transfer the chip 70 (or an interposer or strap including the chip 70) from a sheet or roll having multiple chips or interposers, to a suitable location in connection with the antennas 72 and 74. As an alternative, the RFID chip 70 may be placed using a pick-and-place operation. As a further alternative the RFID device 14 may be formed separately and placed on the second major surface 64 as an inlay.

The printing and/or RFID device formation steps may be done with the flexible substrate being part of a sheet of material (such as a roll material) having substrate material for numerous devices. The individual flexible substrates 12 for individual of the badges 10 may be cut or otherwise physically separated from the roll or sheet of material using die cutting, butt cutting, or another suitable separation method.

It will be appreciated that other steps may be taken with regard to the flexible substrate 12 to add layers or change properties for the flexible substrate 12. For example the flexible substrate 12, with the printed visual material, and the RFID device 14, may be laminated between layers of plastic to provide protection for the underlying layers and/or to increase the strength, stiffness, and/or structural robustness of the flexible substrate 12.

Figure 7:
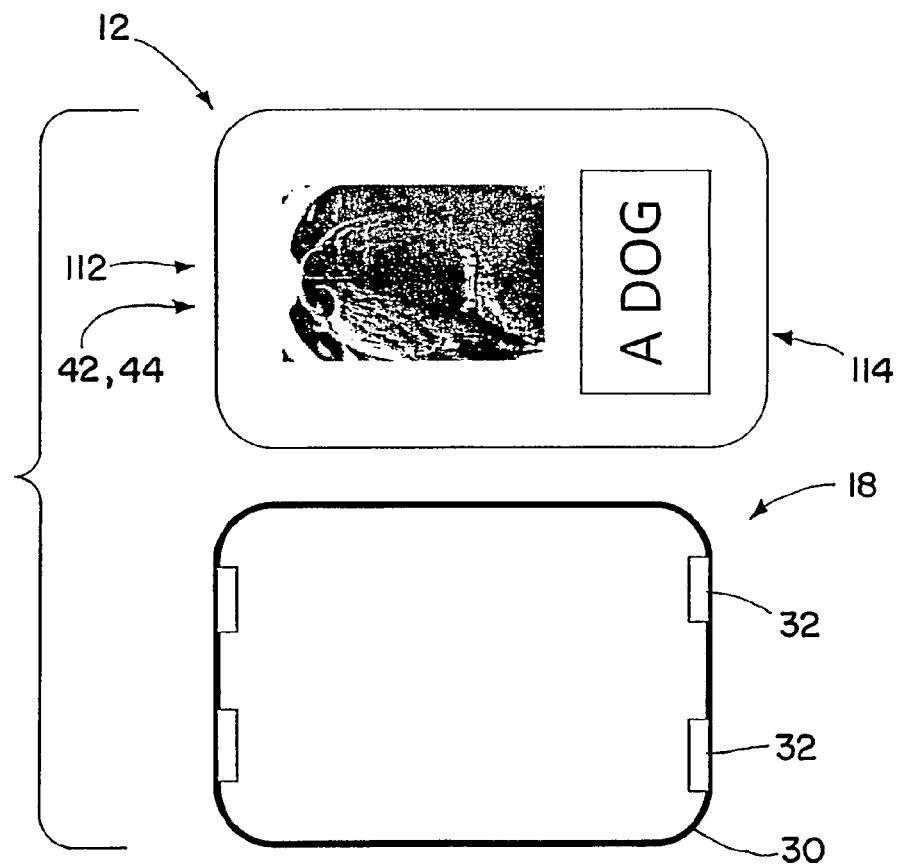
FIG. 7 is a plan view of the flexible substrate and holder of the badge of FIG. 1, at an intermediate step in the method of FIG. 6.

The flexible substrate 12 is overlapped and secured in step 108. The flexible substrate 12 may be folded at the fold line 78 with the substrate parts 22 and 24 secured in the overlapped condition by use of the adhesive strip 80 (or another suitable mechanism) to connect the ends 42 and 44, producing the overlapped substrate 12 shown in FIG. 7. As can be seen in FIG. 7, the overlapped substrate is longer that the length of the frame 30 of the holder 18, at least when the overlapped substrate 12 is in a flat condition.

In step 110 the flexible substrate 12 is deformed to fit into the frame 30. The connected edges 112 and 114 of the flexible substrate 12 are moved toward each other, bowing the center portions of the substrate parts 22 and 24 away from one another. This allows the flexible substrate 12 to fit into the frame 30, with the substrate parts 22 and 24 bulging in opposite directions away from a plane of the frame 30. The clips 32 and 34 on opposite sides of the frame 30 secure the flexible substrate 12 in place, maintaining the substrate 12 in a bowed condition. The result is the badge 10 shown in FIG. 1.

Once the substrate 12 is installed in the holder 18 the badge 10 is ready for use. The holder 18 may be attached to a lanyard, clip, or other mechanism to allow the badge to be worn by a person, for example. Such a clip or other mechanism may be integrally formed as part of the holder 18. For example a metal clip may be inserted in a mold used to form the molded holder 18, with the metal clip being integrally formed as part of the molded holder 18.

It will be appreciated that many variations are possible for the configuration of the badge 10. For example, a foam material or other lightweight flexible material may be placed on a back (second) side of the substrate 12, to provide separation between the substrate parts 22 and 24 when the parts 22 and 24 are overlapped.

Figure 8:
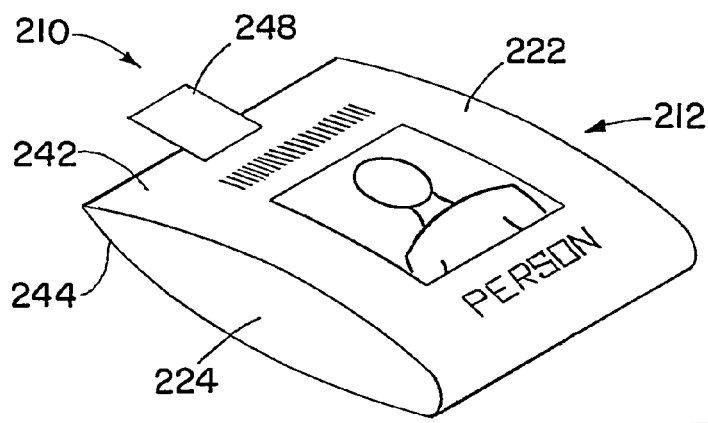
FIG. 8 is an oblique view of a badge in accordance with an alternate embodiment of the present invention.

FIG. 8 shows an alternative badge 210 that has a flexible substrate 212 that overlapped in a teardrop shape. The flexible substrate 212 is similar to the flexible substrate 12 (FIG. 1), for instance differing only in how it is secured. The substrate parts 222 and 224 are secured at their ends 242 and 244, such as by an adhesive or by a clip 248.

Figure 9:
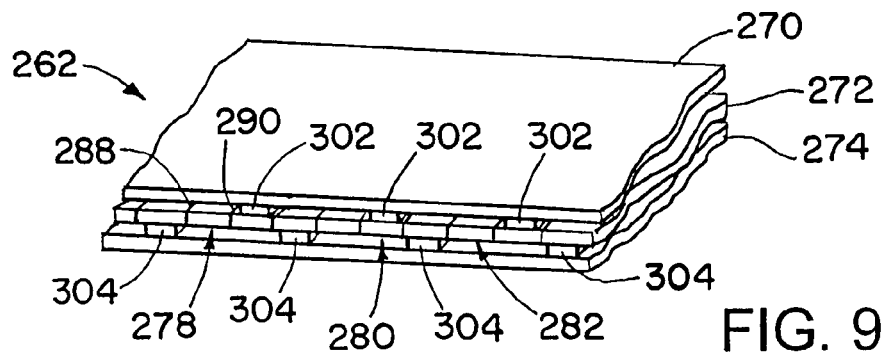
FIG. 9 is an oblique view of a badge substrate in accordance with another alternate embodiment of the present invention, with the badge substrate in a compact configuration.
Figure 10:
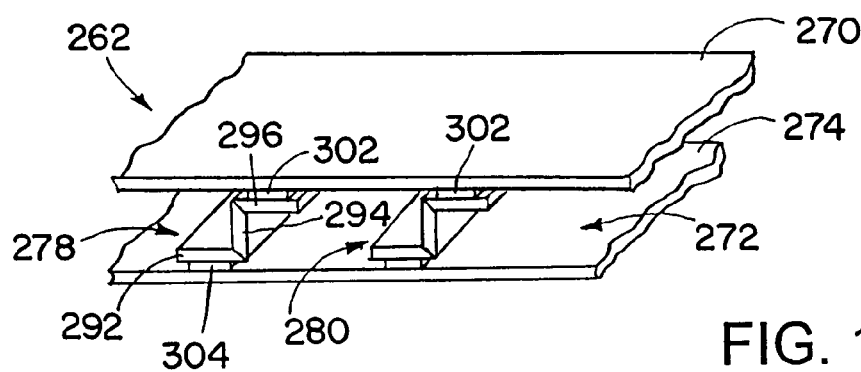
FIG. 10 is an oblique view of the badge substrate of FIG. 9, with the badge substrate in an expanded configuration.

FIGS. 9 and 10 show another alternative badge substrate 262, which has three layers 270, 272, and 274. The top layer 270 overlaps the bottom layer 274. The top layer 270 and the bottom layer 274 may be parts of a single piece of flexible substrate material. The middle layer 272 is scored so as to be separated into segments 278, 280, and 282, as a shear force is applied to the top layer 270 relative to the bottom layer 274. The segments 278, 280, and 282 are in turn scored on fold lines, such as the fold lines 288 and 290 of the segment 278. The scoring along the fold lines 288 and 290 allows parts 292, 294, and 296 of the segment 278 to fold relative to one another as shear force is applied between the top layer 270 and the bottom layer 278. The segments each have a part at one end adhesively coupled to the bottom layer 270, and a part at an opposite end adhesively coupled to the bottom layer 274. Adhesive pads or layers 302 and 304 may be used for this adhesive coupling. When a shear force is applied to the top layer 270 relative to the bottom layer 274, the top layer 270 shifts position relative to the bottom layer 274. This shifts the substrate 262 from the compact configuration shown in FIG. 9, to the expanded configuration shown in FIG. 10. The middle parts of the segments 278, 280, and 282 thus deploy and separate the top layer 270 and the bottom layer 274, expanding the substrate 262 and increasing the thickness of the expandable substrate 262. Further details on such structures may be found in co-owned U.S. Pat. No. 7,379,024, which is incorporated herein by reference in its entirety.

An RFID device may be on one or both of the layers 270 and 274. The substrate 262 has an advantage that it is lightweight, and may be passed through a printer prior to being expanded. The substrate 262 may be maintained in an expanded configuration using a suitable clip or frame, such as those described herein with regard to other embodiments.

It will be appreciated that the embodiments described above are only a few of the many possible configurations for badges having RFID devices antennas or other parts of which are spaced apart. Such badges have the advantage of maintaining at least part of the RFID device away from a wearer, no matter what the orientation of the badge relative to the user. This improves the ability to communicate with the RFID device. Even with this important advantage, the badges described herein do not rely on complicated or expensive structures. The flexible substrates, with their RFID devices attached, may be inexpensive to produce, in view of the ability of the flexible substrate to pass through a printer, for example for printing of visual indicia and/or antenna(s) of the RFID device. Alternatively or in addition the production of the badges may be facilitated by producing multiple flexible substrates for multiple badges from a roll or sheet of substrate material. The holder likewise may be an inexpensive and uncomplicated structure.

Figure 11:
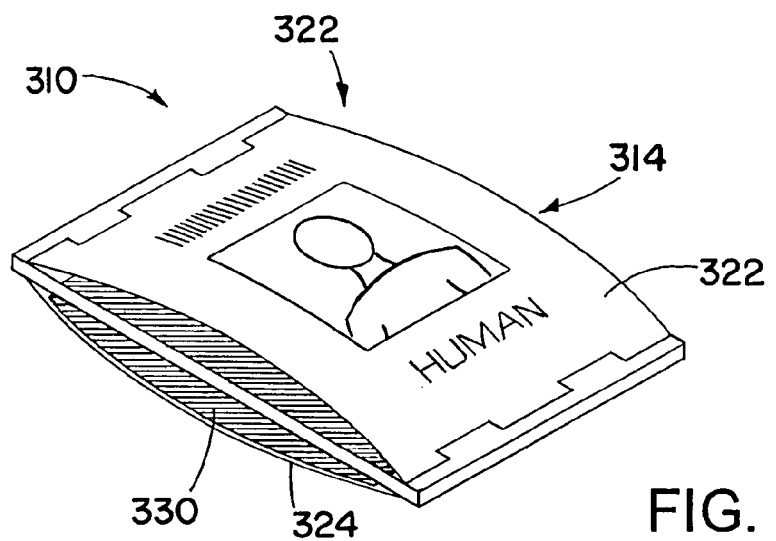
FIG. 11 is an oblique view of a badge in accordance with still another embodiment of the present invention.

FIG. 11 shows part of another alternative badge 310, a substrate 312 that has an RFID device 314 on a back (inner) surface of a first substrate part 322. A second substrate part 324, configured to be closer to a user of the badge 310 when the badge is worn, operates as a reflector or ground plane to assist in isolating the RFID device 314 from interference of the proximity of the body of the user. The back (inner) surface of the substrate part 324 may have a conductive element 330, such as a rectangle or other-shaped conductive material, formed for example by printing conductive ink, that assists in the electrical isolation of the RFID device 314. The badge substrate 312 may be maintained in a thickened condition using a frame or other securing mechanism, such as described herein with regard to other embodiments.

As noted above, it will be appreciated that many variations are possible for the general concept of a flexible substrate (in one or more pieces) being overlapped and held by a holder with parts separated from one another. Parts of an RFID device may be located on both of the separated parts to improve responsiveness of the RFID device with the badge in a variety of orientations relative to the wearer. It will also be appreciated that the concept of spacing apart portions of an RFID device may be applied to other sorts of devices other than badges. Overlapped structures such as those described herein may be used for RFID devices in any of a wide variety of other situations, such as situations in affixing or securing RFID devices to objects having conductive material or high water content, for example. Further information on such uses may be found in U.S. Pat. No. 7,379,024, which was incorporated by reference above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A badge comprising:
   a radio frequency identification (RFID) device on a flexible substrate; and
   a holder having a frame with opposite ends defining a length that maintains the flexible substrate in a deformed condition providing increased thickness to the RFID device, the flexible substrate having a length longer than the length of the frame;
   wherein the deformed condition includes a first part of the flexible substrate overlapping a second part of the flexible substrate;
   wherein the RFID device includes one or more antennas and an RFID chip directly coupled and attached to the one or more antennas, so as to allow the RFID to interact with external readers/detectors;
   wherein a first at least part of the one or more antennas is on a first part of the flexible substrate; and
   wherein a second at least part of the one or more antennas is on a second part of the flexible substrate.

2. The badge of claim 1, further including an adhesive strip along one end of the flexible substrate.

3. The badge of claim 1, wherein the flexible substrate has a bowed shape.

4. The badge of claim 1, wherein the holder includes:
   clips on opposite sides of the frame; and
   wherein the clips hold the flexible substrate to the frame, with the flexible substrate in the deformed condition.

5. The badge of claim 1, wherein the flexible substrate includes:
   a first part of the flexible substrate that includes a front surface of the badge; and
   a second part of the flexible substrate that includes a back surface of the badge.

6. The badge of claim 5, wherein the deformed condition includes the first part and the second part bulging in opposite directions from a plane of the holder.

7. The badge of claim 5, wherein the parts of the flexible substrate have respective parts of the RFID device upon them.

8. The badge of claim 7, wherein the respective parts include the respective first and second at least part of the one or more antennas.

9. The badge of claim 8, wherein both of the pair of antennas are directly coupled to an RFID chip of the RFID device.

10. The badge of claim 1, wherein the deformed condition includes separation by air space.

11. An identification device comprising:
    a monolithic substrate having a first substrate part and a second substrate part;
    a radio frequency identification (RFID) device on the monolithic substrate;
    wherein respective portions of the RFID device are on the substrate parts;
    wherein the first substrate part overlaps the second substrate part, with separation maintained between at least portions of the substrate parts in which a holder maintains the substrate in a bowed out condition providing increased thickness to the RFID device;
    wherein the respective portions of the RFID device include at least portions of one or more antennas of the RFID device; and
    wherein the one or more antennas are directly coupled to an RFID chip of the RFID device.

12. The device of claim 11, wherein the identification device is a badge.

13. A method of making an identification device, the method comprising:
    providing a frame having ends;
    printing one or more visual material elements on a flexible substrate;
    overlapping parts of the flexible substrate;
    placing the flexible substrate in the frame such that the parts of the flexible substrate bulge away from a plane of the frame; and
        spacing apart overlapped parts of the flexible substrate that include respective portions of a radio frequency identification (RFID) device that is on the flexible substrate wherein the RFID device includes one or more antennas and an RFID chip directly coupled to the one or more antennas, so as to allow the RFID to interact with external readers/detectors; wherein a first at least part of the one or more antennas is on a first major surface of the flexible substrate; and wherein a second at least part of the one or more antennas is on a second major surface of the flexible substrate.

14. The method of claim 13, wherein the visual material elements include pictures, logos, or holograms.

15. The method of claim 13, further comprising, after the spacing apart, securing the flexible substrate in a holder to maintain the overlapped and spaced apart condition.

* * * * *